United States Patent
Starr et al.

[11] Patent Number: 4,753,267
[45] Date of Patent: Jun. 28, 1988

[54] REFRIGERATION VALVE

[75] Inventors: Keith E. Starr, Roxboro, N.C.; Carlton M. Rudd, Canton, Ohio

[73] Assignee: Eaton Corporation, Cleveland, Ohio

[21] Appl. No.: 59,088

[22] Filed: Jun. 8, 1987

[51] Int. Cl.$^4$ .............................................. F16K 15/20
[52] U.S. Cl. .................. 137/590; 137/234.5; 62/292; 220/85 B; 251/144
[58] Field of Search ............ 137/590, 232, 343, 234.5; 251/144; 138/26; 220/DIG. 19, 85 B; 62/292

[56] References Cited

U.S. PATENT DOCUMENTS

| 499,956 | 6/1893 | Berry | 137/232 |
| 655,451 | 8/1900 | McCaslin | 137/232 |
| 1,684,475 | 9/1928 | Collier et al. | 137/590 |
| 2,082,972 | 6/1937 | Perry | 137/232 |
| 2,162,537 | 6/1939 | Peo | 62/292 |
| 3,426,787 | 2/1969 | Fulter | 137/232 |
| 4,317,472 | 3/1982 | Zahil | 220/85 B |

FOREIGN PATENT DOCUMENTS 536437 1/1957 Canada ............................. 137/232

Primary Examiner—A. Michael Chambers
Attorney, Agent, or Firm—C. J. Toddy

[57] ABSTRACT

A valve 10 is disclosed for effectively sealing an opening 11 in an accumulator tank 12 for a refrigeration system holding a refrigerant under very high pressure. The valve stem 17 has a cylindrical portion 29 which increases in diameter toward the flange 28 forming an arcuate concave surface 30 and a base flange 27 having a diameter larger than the opening 11 to provide an effective seal.

4 Claims, 1 Drawing Sheet

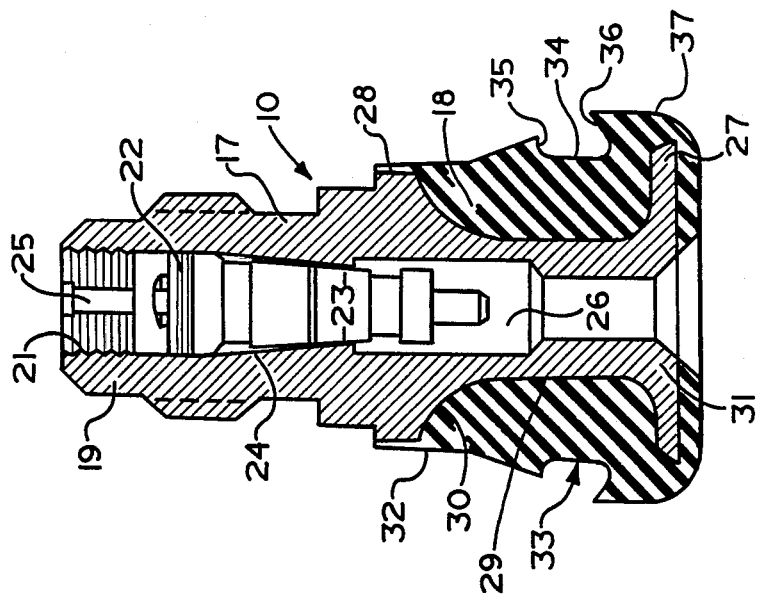
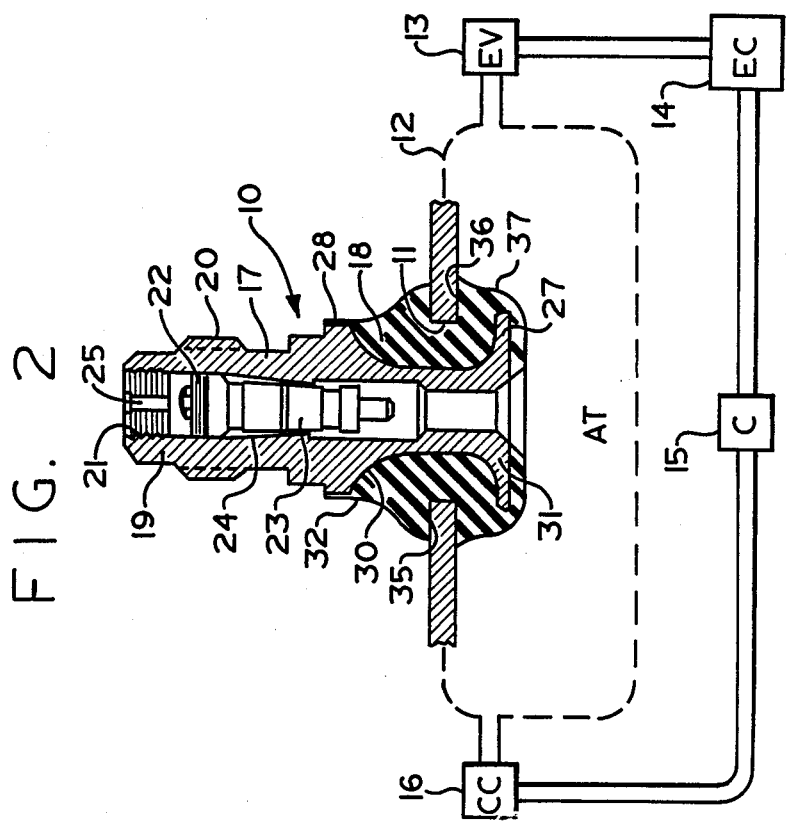

REFRIGERATION VALVE

This invention relates to a refrigeration valve mounted within an aperture in an accumulator tank for a refrigeration system and more particularly to a refrigeration valve which is "snapped-in" an aperture in an accumulator tank for a refrigeration system and through which a refrigerant is injected under high pressure of between 9 and 90 atmospheres.

So called "snap-in" valves for tubeless tires are known in the prior art, for example, U.S. Pat. Nos. 4,538,658, 4,475,578, 2,874,750, 4,064,923 which are snapped into a hole in a tire rim. However, tire valves are required to seal the aperture in the rim at relatively low pressures between 28 to 80 PSI, and furthermore, tire valves seal air in the tire rather than a refrigerant, such as Freon. The much higher pressure of refrigeration systems and the radically different physical characteristics of refrigerants simply do not allow conventional prior art snap-in tire valves to form an effective seal in refrigerator systems.

A principle object of the present invention is to provide a new and improved snap-in type valve for use in sealing with an aperture in an accumulator tank for a refrigeration system which will seal the aperture against leakage of the refrigerant at pressures up to 3000 PSI.

Another object of the present invention is the provision of a new and improved refrigeration valve as characterized above wherein the valve insert and the valve body has a portion substantially larger in diameter than the diameter of the aperture in the accumulator tank with the body of the valve designed to provide an effective seal around the aperture under extremely high pressure of a refrigerant.

FIG. 1 is a vertical sectional view showing the valve stem and valve body.

FIG. 2 is a vertical sectional view similar to FIG. 1 showing the valve mounted in a refrigeration system which is schematically shown.

Referring to the drawings, the refrigeration valve 10 of the present invention is adapted to be inserted into an opening 11 formed in the accumulator tank 12 containing a refrigerant such as Freon under high pressure of up to 3000 PSI. The refrigerant passes from the accumulator tank through an expansion valve 13 to the evaporator coil 14 and hence to the compressor 15. The compressed refrigerant than passes to the condenser coil 16 and hence back to the accumulator tank 12.

The refrigeration valve 10 includes a valve stem 17 made of a suitable rigid material, preferably brass and a molded rubber body 18 which is bonded or adhered to the exterior surfaces of the stem 17. The stem 17 is elongated and of tubular form. The upper end 19 of the stem includes an externally threaded portion 20 adapted to receive an internally threaded closure cap, not shown. Internal threads 21 are provided at the upper end of the stem which mate with threads 22 of a valve core 23. The valve core 23 has a slightly inwardly tapering section which seats upon a similarly tapered core seat 24 in the bore 26. The valve core 23 is normally closed and is opened by actuation of the valve plunger 25 thereby opening the valve permitting the injection or egress of refrigerant through the bore 26.

The end of the stem 17 opposite to the upper end 19 is provided with an annular base flange 27 having a diameter larger than the diameter of the opening 11 in the accumulator tank 12. The stem 17 is also provided with a intermediate flange 28 located intermediate the ends of the stem 17 having a diameter slightly smaller than the opening 11 in the accumulator tank. The outer surface of the stem 17 between the flanges 27 and 28 includes a cylindrical portion 29 which flares outwardly or increases in diameter from the cylindrical portion 29 to the radial facing surface of the flange 28 forming a arcuate concave surface 30. The lower end of the cylindrical portion 29 is joined to the annular flange 27 by an arcuate portion 31 joining the base flange 27 to the cylindrical portion 29. The radius of curvature of the arcuate portion 31 is substantially less than the radius of curvature of the arcuate concave surface 30.

The rubber body 18 as previously stated extends from the flange 28 to the base flange 27 and is of course adhered to the outer surface of the stem 17 including the surfaces 29, 30 and 31. The outer surface of the rubber body 18 includes a tapered portion 32 which terminates in an annular groove 33 forming a base 34 adapted to engage the cylindrical base of aperture 11. The opposed walls 35 and 36 of the groove 33 are adapted to engage the surfaces of the accumulator tank adjacent the opening 11. The groove 33 is formed centrally of the cylindrical portion 24 of the stem. The diameter of the base 34 of the groove 33 is substantially greater than the diameter of the opening 11. The body 18 includes an enlarged end flange 37 in which the base flange 27 is embedded.

The valve assembly 10 as shown in FIG. 1 of the drawings is inserted through the opening 11 from a position inside of the tank 12 so that the tapered portion 32 passes through the opening and the valve forced through the opening until the annular groove 33 is seated in the opening 11 of the tank 72. As shown in FIG. 2, the rubber adjacent the groove 33 is compressed and the rubber adjacent the groove 33 bulges outwardly as shown in FIG. 2 both above and below the opening 11 to form an effective seal.

Forces of the high pressure of the refrigerant in the accumulator tank 12, acting against the end flange 37, cannot blow the valve 10 out of the aperature 11 since the annular flange 27 of the stem has a larger diameter than the aperature 11. However, such forces do increase the effective seal of the flange 36. Moreover, since the diameter of the groove base 34 is substantially less than the diameter of the aperature 11, the rubber body is highly compressed in the area between the stem portion 29 and the aperture 11. This compression together with the configuration of the portion 30 of the stem produces counter acting forces effective to seal the flange 35 around the outer surface of the tank 12 adjacent the aperature 11.

I claim:

1. A refrigeration valve for mounting within an aperture in an accumulator tank for a refrigeration system adapted to seal said aperture and through which a refrigerant is injected under high pressure of between 9 to 90 atmospheres, said valve comprising;

a tubular rigid stem adapted to receive a check valve therein at one end of the stem;

a base flange at the other end of said stem having a diameter substantially larger than the diameter of said aperture;

a second flange intermediate the ends of said stem having a diameter slightly smaller than the diameter of said aperture;

a body of rubber-like material bonded to said stem between said flanges;

said body having an annular groove formed in the outer surface thereof intermediate said base and second flanges, said groove having a cylindrical base of a diameter substantially larger than the diameter of said aperture;

said body having a base flange larger in diameter than the base flange of said stem;

said stem having a cylindrical portion of substantially lesser diameter than said aperture extending axially of the valve from an axial location adjacent the base flange of said stem, through the base of said groove to a location axially past said groove, said cylindrical portion, in cross section, having an outwardly flared portion of increasing diameter from said cylindrical portion to said second flange.

2. A refrigeration valve as claimed in claim 1 in which said base flange and said cylindrical portion of said stem are connected by a large radius of curvature.

3. A refrigeration valve as claimed in claim 1 in which the diameter of said cylindrical portion of said stem is approximately one half the diameter of the base of said groove.

4. A refrigeration valve as claimed in claim 1 in which the radial thickness of the wall of said body at the base of said groove is at least twice the radial thickness of the wall of said stem at said cylindrical portion.

* * * * *